United States Patent [19]

Sperber

[11] Patent Number: 5,393,794
[45] Date of Patent: Feb. 28, 1995

[54] INSULATION MATERIAL AND METHOD USING FLY ASH

[76] Inventor: Henry Sperber, 8 Red Fox La., Englewood, Colo. 80111

[21] Appl. No.: 49,569

[22] Filed: Apr. 19, 1993

[51] Int. Cl.⁶ .............................................. C08J 9/00
[52] U.S. Cl. ........................................ 521/78; 239/8; 239/9; 521/54; 521/55; 521/91; 523/218; 523/219
[58] Field of Search ................. 521/54, 55, 78, 91; 523/218, 219

[56] References Cited

U.S. PATENT DOCUMENTS

| | | | |
|---|---|---|---|
| 3,869,295 | 3/1975 | Bowles et al. | 106/90 |
| 4,111,713 | 9/1978 | Beck | 523/219 |
| 4,331,726 | 5/1982 | Cleary | 521/55 |
| 4,425,440 | 1/1984 | Bloembergen et al. | 521/54 |
| 4,441,944 | 4/1984 | Massey | 156/71 |
| 4,595,710 | 6/1986 | Albertelli et al. | 521/100 |
| 4,659,385 | 4/1987 | Costopoulos et al. | 106/87 |
| 4,681,788 | 7/1987 | Barito et al. | 428/68 |
| 4,768,710 | 9/1988 | Sperber | 239/8 |
| 4,798,753 | 1/1989 | Abauf et al. | 428/69 |
| 5,131,590 | 7/1992 | Sperber | 239/8 |

*Primary Examiner*—Morton Foelak
*Attorney, Agent, or Firm*—Sheridan Ross & McIntosh

[57] ABSTRACT

An insulating material consisting essentially of fly ash particles and a binder and a method for making the same. In one embodiment of the present invention, fly ash particles are mixed with a dissipating foam which contains a binder. The foam acts to spread the binder and separate the fly ash particles, thereby coating the fly ash particles with the binder. When the foam dissipates the binder acts to bind the fly ash particles together in clusters. The clusters of fly ash particles are then suitable to be used as blown-in insulation.

11 Claims, 2 Drawing Sheets

INSULATION MATERIAL AND METHOD USING FLY ASH

FIELD OF THE INVENTION

The present invention relates to fly ash insulating material and processes for making fly ash insulating material in which the fly ash acts as the major source of insulation.

BACKGROUND OF THE INVENTION

In order to conserve energy, an increasing number of homeowners and building contractors are installing insulation throughout their buildings. In many cases the area to be insulated is a cavity in the roof or wall of the building. One type of insulation often used for such cavities is blown-in insulation. Blown-in insulation comprises an insulating material which can be injected into a cavity via air-pressure. A number of different products have been used in the past to fabricate blown-in insulation (i.e. cellulose fiber, fiberglass, rockwool, etc.).

The level of insulation required (the R-value), and therefore the type and amount of insulation used, is dependent on the characteristics of the specific area to be insulated. Insulation manufacturers are constantly searching for low cost materials which exhibit sufficient insulating properties and can be put into a form suitable for blowing into a cavity. Logically, the most inexpensive insulating material which can be used for an application requiring a given R-value is the most desirable.

Fly ash is a coal byproduct which occurs as spherical particles usually ranging in diameter from 0.5 to 100 microns. Depending on the specific makeup of the coal used, when coal is burned, fly ash makes up anywhere from 10 to 85% of the coal ash residue. Up to 20% of fly ash consists of cenospheres, which are lightweight spheres of silicate glass filled with nitrogen and carbon dioxide that float in water. This makes pond disposal of coal ash very difficult as the cenospheres are apt to create a suspended solids problem in the pond. Also, there are significant environmental restrictions and costs associated with other forms of disposal. Therefore, power plants and other producers of fly ash are extremely willing to sell large quantities of fly ash at a relatively modest price (a considerably lower price than an equal volume of standard insulating materials).

Thus, it would be advantageous to use fly ash as an insulating material due to its availability and low cost. In addition, creating insulating material from fly ash provides a productive use for an ordinarily undesirable byproduct.

SUMMARY OF THE INVENTION

Accordingly, one object of the present invention is to provide an insulating material consisting essentially of fly ash.

Another object of the present invention is to provide a method for producing an insulating material from fly ash.

Another object of the present invention is to provide a method for producing an insulating material from fly ash using a binder and a dissipating foam.

In one embodiment of the present invention, fly ash particles are separated and mixed with a foam material which includes a binder. The foam material acts to spread the binder to coat the separated fly ash particles. As the mixture dries and the foam dissipates, clusters of fly ash particles are formed. The binder which has coated the individual fly ash particles connects the particles to one another. When the mixture is allowed to dry, the foam is no longer present, and clusters of fly ash particles remain. The fly ash clusters may then be packaged and used as a blown-in insulation.

In another embodiment of the present invention, the mixture of foam, binder, and fly ash is output onto a conveyor. The mixture is dried on the conveyor such that the foam dissipates and clusters of dried fly ash particles, connected via the binder, are produced. At the end of the conveyor, the fly ash clusters are packaged to be used as blown-in insulation.

In still another embodiment of the present invention, the mixture of foam, binder, and fly ash is blown directly into a cavity of a building. The mixture is allowed to dry in while in the cavity. When the foam dissipates, clusters of fly ash particles connected by the binder act as an insulating material in the cavity.

In a further embodiment of the present invention, a dry adhesive is applied to separated fly ash particles. When a liquid, such as water, is added to the fly ash particles, the adhesive binds the fly ash particles into clusters which may be blown into a cavity to be insulated.

DETAILED DESCRIPTION

Figure 1:
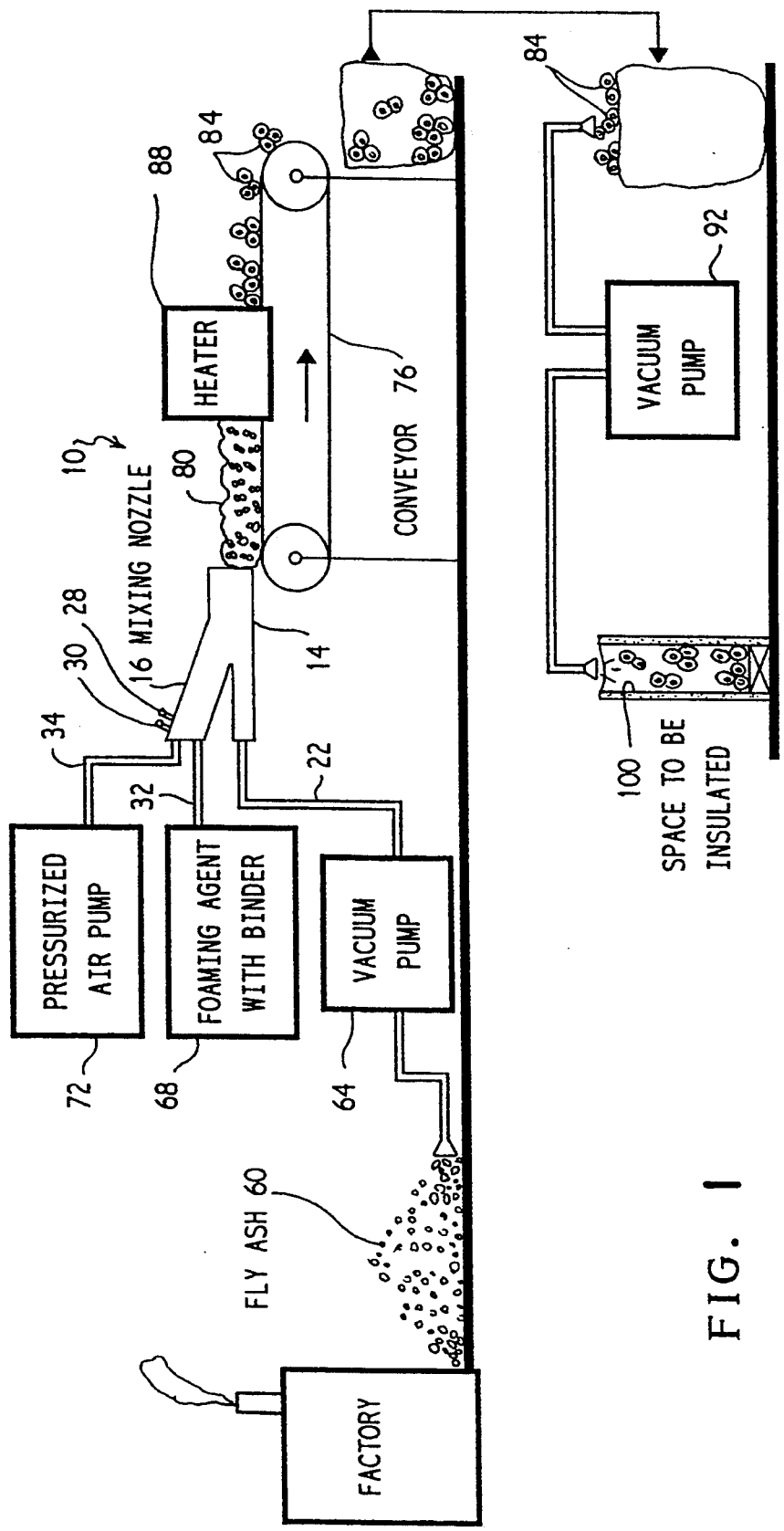
FIG. 1 illustrates the production and use of fly ash insulation according to one embodiment of the present invention.
Figure 2:
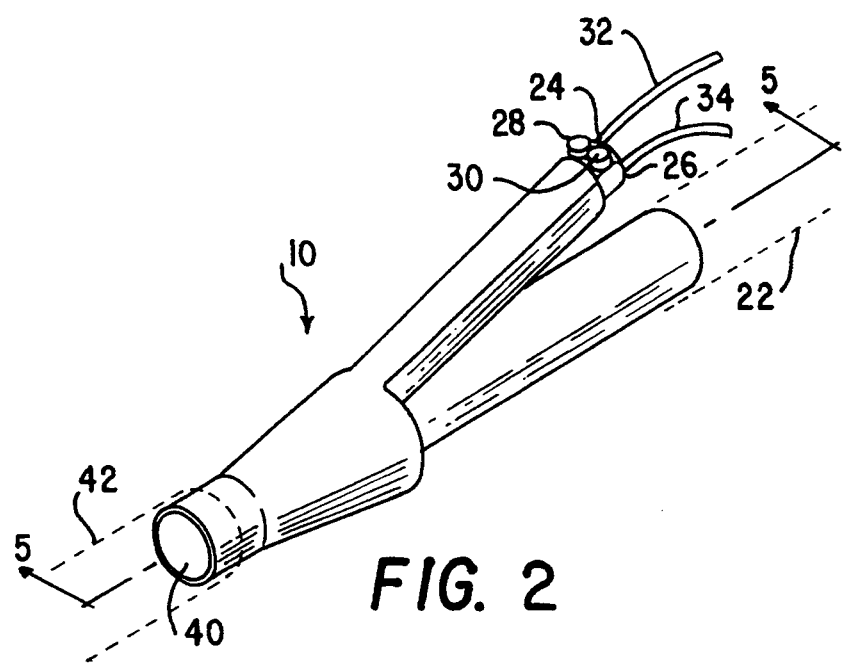
FIG. 2 illustrates a mixing nozzle which is used in conjunction with one embodiment of the present invention.
Figure 3:
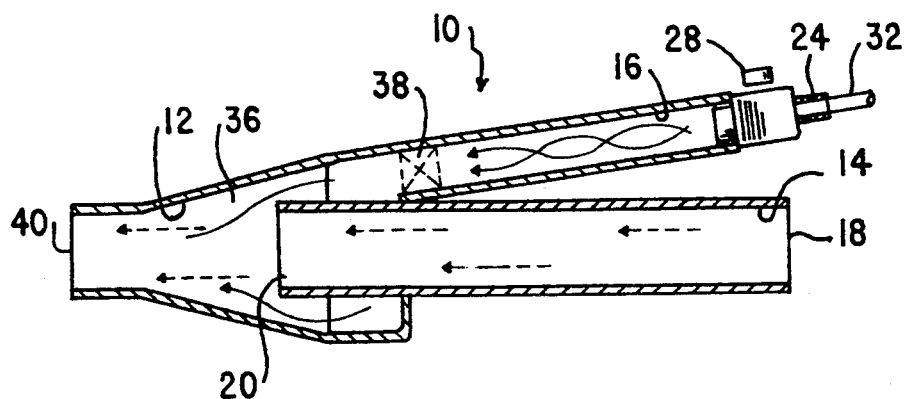
FIG. 3 illustrates a cross-sectional view of the mixing nozzle of FIG. 2.

The process by which one embodiment of the fly ash insulation of the present invention is made and installed is illustrated in FIG. 1. Fly ash 60 may be produced as a byproduct of coal burned at a factory. Fly ash can be defined as finely divided residue that results from the combustion of ground or powdered coal. In comparison, coal fly ash has a density of about 32 times greater than that of cellulose fiber insulation; about 32 times greater than certain fiberglass insulation, about 16 times greater than rockwool insulation and about 3-½ times greater than wood ash.

In this embodiment the fly ash insulation is manufactured at the factory so as to eliminate the need for transport of the fly ash 60. A vacuum pump 64 is provided to feed fly ash 60 to conduit 14 of mixing nozzle 10. Mixing nozzle 10 is also connected to a supply of foaming agent including a binder 68 and a pressurized air pump 72 via lines 32 and 34, respectively.

The manner of using the nozzle 10 and of production and placement of insulating material will now be described. A foaming agent is introduced through the first line 32 and through the first entrance port 24 into the second conduit 16, with the rate of flow being controlled by the first valve 28. Any of a number of foaming materials well known in the art can be used. A pressurized gas, such as air, is introduced through the second line 34 and through the second entrance port 26 at a rate controlled by the second valve 30. Inside the first conduit 16, the pressurized air mixes with the foaming agent for use in producing a foam which moves through the second conduit 16. The baffle or obstacle 38 can be used to assist in producing foam. The foaming material in its foamed state moves through the exit port 36 of the second conduit 16 and into the mixing chamber 12.

Substantially dry, lofted fly ash particles which have been lofted by mixing with pressurized air from vacuum pump 64 are introduced through entrance port 18 into the first conduit 14. The lofted fly ash particles and pressurized air move through the first conduit 14 and through the exit port 20 of the first conduit 14 into the mixing chamber 12.

In the mixing chamber 12, the foaming agent in its foamed state mixes with the lofted fly ash and is forced by the pressurized air entering the nozzle 10 through the exit port 40 of the nozzle 10 and away from the nozzle 10. The tapered area of the second conduit 16 assists in preventing back flow of material into the conduits, particularly the second conduit 16. Such back flow can occur, for example, when flow of insulation material through the nozzle 10 is stopped. If flow of the fly ash particles and foamed material were permitted back into the second conduit 16, it would be necessary for the operator to frequently clean out or unplug the conduit 16 whenever flow of the materials is stopped by the operator for some reason, such as moving the apparatus to a new cavity for filling with the insulation.

An amount of adhesive material can be included in the foam material, for example, by introduction through the first line 32, mixed with the foaming agent. Any adhesive material capable of adhesion to the fly ash particles can be used provided it does not interfere with the foaming process. For example, foamable adhesives such as polyvinyl acetate, ethylvinyl acetate, animal glues and the like can be used. The adhesive material is preferably provided in sufficient quantity that it is capable of maintaining the loft or desired separation (spread) of the fly ash particles after it has cured or set. The adhesive material preferably has a curing or setting time sufficiently short that it cures or sets before substantial drying or dissipation of the foam.

Mixing nozzle 10 outputs the mixture 84 of foam, fly ash, and binder onto conveyor 76 for drying. The foam acts to spread the binder and coat the individual fly ash particles. Ideally, the binder covers substantially all of the spherical outer surface of each fly ash particle. The fly ash particles begin to bind as they are mixed in the nozzle 10 and output onto conveyor 76. When the mixture 80 is dried by heater 88, the foam dissipates and irregularly shaped clusters 84 of a plurality of fly ash particles are formed, which are inter-connected by the binder. The clusters of fly ash particles 84 are then packaged to be used as blown-in insulating material.

Depending on the size and speed of conveyor 76, the type of foaming agent and binder used, and the ambient conditions in which this procedure is performed, heater 88 may be eliminated. Without heater 88, a sufficient amount time must be accorded for the foam to dissipate and the binder to dry in ambient conditions before packaging. Regardless of whether a heater or ambient air is utilized in connection with the drying state, it is critical that there be sufficient drying of the fly ash particles such that the fly ash particles remain in the separated state caused by the lofting and foam/binder. If sufficient drying does not occur, the clusters will tend to collapse and the necessary separation and insulting attributes will be lost. The degree of drying depends upon the type of fly ash, including the density thereof, and the binder employed.

The packaged fly ash insulating material 84 is transported to the site of the space to be insulated 100. Vacuum pump 92 is then used to blow the fly ash insulating material into space 103. Alternatively, a standard insulation feeding apparatus such as the one disclosed in U.S. Pat. No. 4,978,252 to the present inventor may be used in place of vacuum pump 92.

It is important to note that fly ash in its natural form would not be an effective insulator. Fly ash particles are so small, that a volume of fly ash particles alone used to fill a space to be insulated would be too dense to allow the air pockets necessary for effective insulation. The presently described process of forming irregularly shaped clusters of fly ash particles makes fly ash insulation possible without requiring the foam to harden.

It is recognized that the step of packaging the insulating material and transporting it to the job site may be eliminated. Fly ash 60 may be transported to the site of the space to be insulated. In this embodiment, the foamed mixture 80 is blown directly into space 100 through nozzle 10. Mixture 80 is allowed to dry within space 100. When the foam dissipates, a lattice of clusters 84 will remain within space 100 to provide insulation.

Further, clusters 84 may be installed at the job site using foam via the same process. In this embodiment, clusters 84 are fed to conduit 14 of nozzle 10 where they are mixed with foam containing binder from supply apparatus 68. Again, the mixture 2s blown directly into space 100. Upon dissipation of the foam, a lattice of larger clusters of fly ash and binder are formed to insulate space 100.

It is also recognized that in other embodiments of the present invention, mixing nozzle 10 may be eliminated. The fly ash particles 60 may be coated with a dry binder/foaming agent combination and mixed with a liquid such as water. The foamed mixture may then be sufficiently dried to form fly ash clusters and packaged to be used as insulating material.

The nozzle 10 may also be eliminated by locating the fly ash in a container and by providing an outlet tube from the bottom to the top of the container. A hole is formed in the container top. The fly ash is coated with a dry binder and a wetting agent is poured into the container. Air is pumped through the hole and a slurry material results with foam being generated as part of the wetting agent. The slurry is outputted from the outlet tube for subsequent creation of the desired insulation.

Although it is preferred that only fly ash particles be utilized in order to take advantage of their properties for insulating purposes, another embodiment involves the inclusion of other insulation particles such as, for example, cellulose-based insulating particles. Other insulating particles would have a density less than that of fly ash particles and would be mixed with fly ash particles in a desired weight or volume ratio that depends on the density of the fly ash, the density of the other insulating particles and the desired degree of insulation.

The other insulating particles including cellulose particles, mix with the fly ash and contribute to the suspension or separation of the fly ash particles in forming the insulation clusters. That is, the fly ash particles are intertwined or intermingled among cellulose particles.

Additionally, when cellulose insulating particles are used for this purpose, after grinding them they contain some amount of binder. This residual binder is useful in contributing to subsequent binding of insulation particles in order to achieve the insulating clusters. Consequently, less binder needs to be added, in comparison with not using cellulose insulating particles, in order to create the insulation clusters.

In addition, in a further embodiment, a dry binder may be used to coat individual fly ash particles 60 without a foaming agent. In this embodiment, when a wetting agent, such as a foaming agent including water is later added, the binder is used in creating clusters of fly ash particles. The foaming agent is used to provide the necessary separation of fly ash-particle clusters, during the activation (chemical reaction or other) of the binder in connection with causing the binder to interconnect or bind certain fly ash particles together to form the clusters.

In another embodiment, substantially all of the fly ash particles are individually coated, e.g., using a foaming wetting agent. After coating to form clusters, and subsequent drying or curing, the formed clusters are shaped or ground to form fine particles. These subsequently formed particles can then be packaged into an insulation bag or they could be sprayed into a cavity that is to be insulated.

The fly ash clusters could also be formed into board stock or panels. Such panels can be of a size, for example, of 12 inches×12 inches×1 inch. The panels are formed by blowing or otherwise providing the fly ash particles with foam and binder into a form having the desired panel size. The formed panels can then be located in a curing oven to enable the clusters to adhere together. In this embodiment, it may be advantageous to use materials or substances in addition to the fly ash particles for filler purposes, for example. The fly ash, however, acts substantially as the only insulating material and separation of fly ash particles is caused substantially only by the binder not the foam, which dissipates.

With regard to the embodiments in which the fly ash insulation is made at the job site and is installed or injected into the area to be insulated continuous with the making thereof, it may be impractical and not feasible to achieve sufficient drying of the clusters of fly ash particles before unwanted settling or collapsing of the particles occurs. In such a case, the necessary separation of fly ash particles is not achieved and the insulation characteristics are not present. To overcome such an occurrence, a specific binder can be employed that chemically reacts with the foam or other liquid in such a way that the necessary binding occurs rapidly among the fly ash particles and such binding continues without settling or collapsing even as the clusters of fly ash particles are injected into a cavity. Alternatively or concomitantly, less dense insulating particles can be mixed with the fly ash particles. In this case, the overall mixture of insulating particles is less dense such that there is little, or sufficiently reduced, tendency to unwantedly settle or collapse thereby not defeating the insulating properties of the particles. The mixture ratio (fly ash particles to less dense particles) depends upon a number of factors including the density of the fly ash particles, the density of the mixed particles, the binder utilized and the desired insulation.

Although several exemplary embodiments of the present invention have been described, it is recognized that one skilled in the art may make further modifications without departing from the spirit and scope of the present invention as detailed by the appended claims.

What is claimed is:

1. A method for insulating a cavity, comprising:
providing a plurality of fly ash insulating particles;
supplying a binder, said supplying step including creating a foam material of a sufficient thickness and said supplying step including separating said insulating particles using said foam material;
mixing said insulating particles dried to provide sufficiently dry clusters with each of said clusters drying a plurality of insulating particles, said having step including dissipating of said foam material while said insulating particles are located outside of the cavity to be filled with said insulating particles, said drying step being discontinued before said clusters collapse and lose desired separation of said insulating particles;
containing said insulating particles while maintaining said insulating particles joined together in said clusters using said binder after having dried and before being placed in the cavity; and
installing said clusters into the cavity after said foam material has dissipated.

2. A method, as claimed in claim 1, wherein:
said providing step includes providing fly ash particles having a density greater than that of insulating particles that substantially do not conduct heat.

3. A method, as claimed in claim 2, wherein:
said fly ash particles constitute substantially all of said insulating particles.

4. A method, as claimed in claim 1, wherein:
said supplying step includes inputting pressurized air used in said separating of said insulating particles.

5. A method, as claimed in claim 1, wherein said supplying step includes:
inputting fly ash particles comprising substantially solid spheres using pressurized air; and
grouping said spheres together into said clusters having irregular shapes, with said clusters being substantially free of voids.

6. A method, as claimed in claim 5, wherein:
said supplying step includes coating substantial portions of substantially all of said fly ash particles with said binder.

7. A method, as claimed in claim 1, wherein:
said drying step includes outputting said insulating particles to a conveyor.

8. A method, as claimed in claim 7, wherein:
said drying step includes drying said insulating particles while on said conveyor.

9. A method, as claimed in claim 1, wherein:
said containing step includes packaging said clusters after said clusters have dried.

10. A method, as claimed in claim 9, wherein:
said containing step includes transporting said packaged clusters to a location having the cavity that is to receive said clusters and un-packaging said clusters.

11. A method, as claimed in claim 10, wherein:
said installing step includes blowing of said clusters into the cavity.

* * * * *